Feb. 28, 1967
E. ARMSTRONG ETAL
3,305,995
METHOD OF MOUNTING METAL SHEETS
Filed Nov. 20, 1964
2 Sheets-Sheet 1
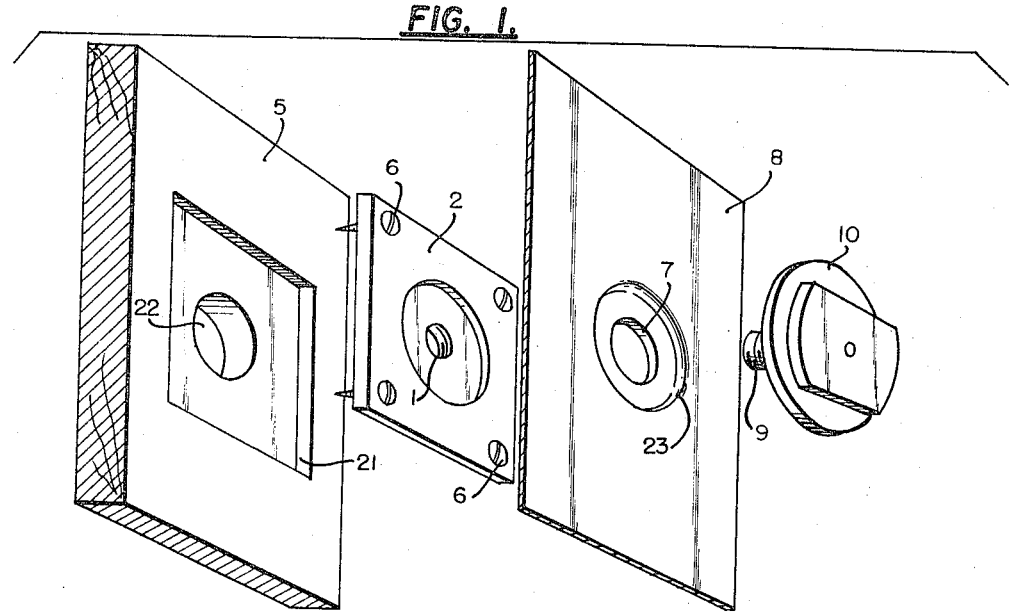
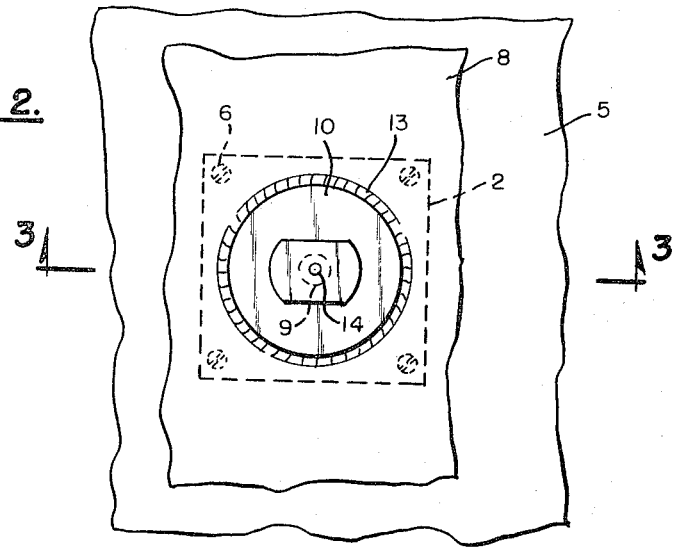
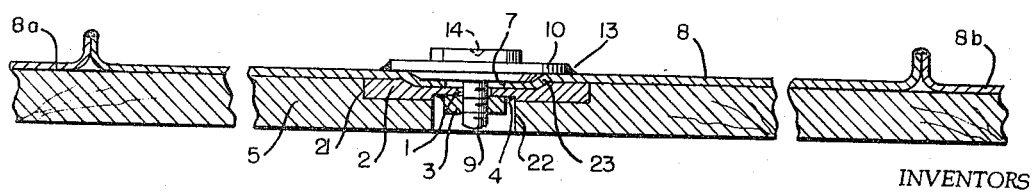
INVENTORS
Edward Armstrong
Robert Glover Jackson
BY *Max L. Libman*
ATTORNEY Feb. 28, 1967  E. ARMSTRONG ETAL  3,305,995
METHOD OF MOUNTING METAL SHEETS
Filed Nov. 20, 1964  2 Sheets-Sheet 2
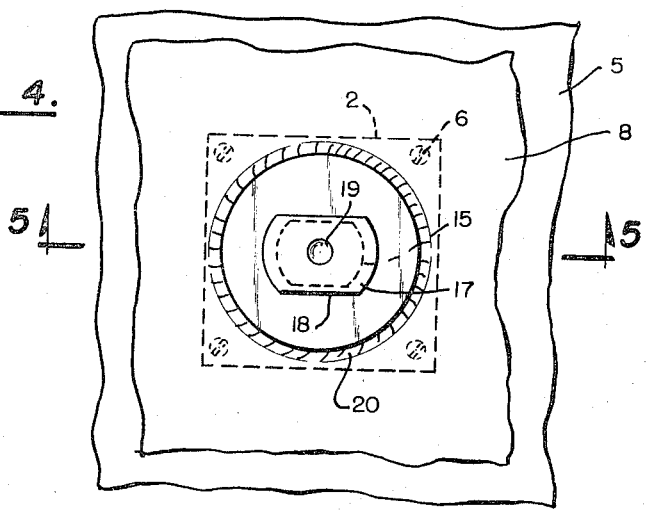
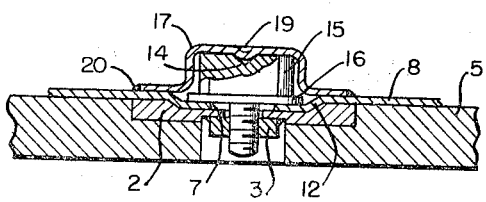
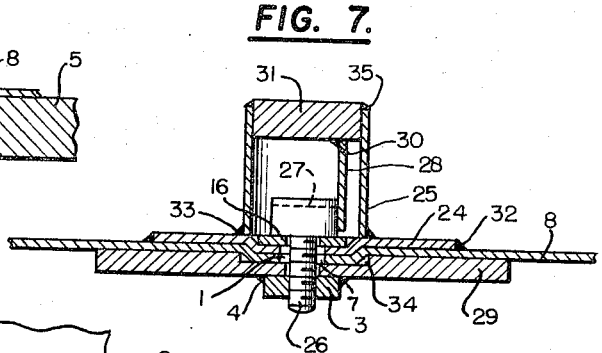
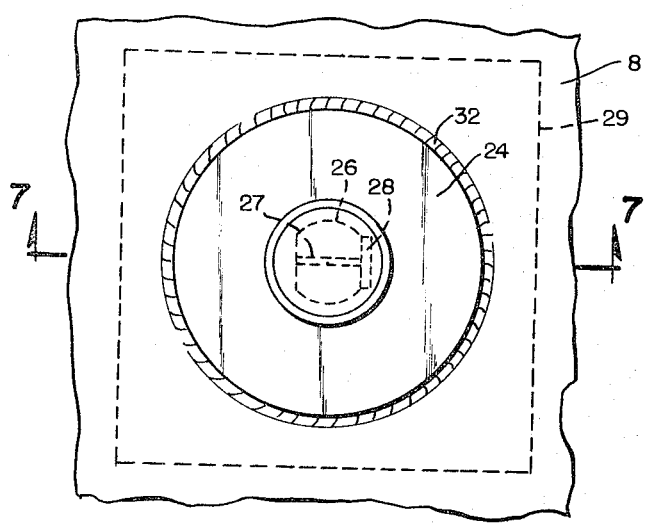
INVENTORS
Edward Armstrong
Robert Glover Jackson
BY  Max L. Libman
ATTORNEY 3,305,995
METHOD OF MOUNTING METAL SHEETS
Edward Armstrong, Durham, and Robert Glover Jackson, Hornchurch, Essex, England, assignors to Conch International Methane Limited, Nassau, Bahamas, a Bahamian company
Filed Nov. 20, 1964, Ser. No. 412,806
Claims priority, application Great Britain, Dec. 3, 1963, 47,748/63
12 Claims. (Cl. 52—512)

This invention relates to a method of mounting metal sheets on a supporting structure.

When mounting metal sheets on a supporting structure, e.g. a wall, it is sometimes necessary that the sheets shall be fastened together, e.g. by welding, brazing or soldering to form a continuous sheet. In such cases it is nearly always necessary that the continuous sheet shall be mounted in more than one place and usually there is at least one mounting per individual sheet. Difficulties have arisen when it is necessary to attach the mounting members to the individual sheets first, before the sheets are fastened together. This is because when fastening, e.g. by welding, it is very difficult if not impossible, to ensure that there is no buckling and no slight shifting of position of the sheets, thereby resulting in strain on the mounting members.

Such difficulties are eliminated according to the present invention in which a metal sheet is mounted on a supporting structure so that it is capable of having its edges fastened to one or more adjacent members by a method comprising providing a screw thread in the supporting structure, passing a bolt through a hole in the sheet, the size of the hole being greater than the cross-sectional area of the shank of the bolt, mounting the sheet temporarily by screwing the bolt into the supporting structure, fastening the edges of the sheet to one or more adjacent members, tightening the bolt into the supporting structure sufficiently to prevent lateral shifting of the sheet, and thereafter sealing the hole in the sheet. The sheets mounted in this way can also be free to oscillate and this can be an advantage in some cases.

The sheet may be any metal, e.g. steel, aluminum or copper, and can be of any shape, for example it can be in the form of trays. This invention is of particular application in mounting the trays to an insulating wall as described in copending U.S. Serial No. 285,279. In this case the mounted metal sheet is a rectangular or square tray, the adjacent members are similar in shape to the mounted metal sheet, i.e. square or rectangular trays, and the supporting structure is thermally insulating material, for example a continuous layer or blocks of asbestos, or balsa wood faced with plywood.

Of course this invention is equally applicable to cases where the adjacent members are of different form and shape from the mounted metal sheet, i.e. they may be girders, differently shaped sheets or rods. The supporting structure need not be a wall of thermally insulating material but can be other types of wall or can be other types of structure capable of supporting a mounted sheet.

The supporting structure must be provided with a screw thread, for example by fixing a nut into the supporting structure. When the supporting structure is wood or non-metallic this can be done by welding the nut to the periphery of a hole in a metallic plate so that there is access to the thread of the nut through the hole in the plate. The plate is then secured, for example by screwing, to the supporting structure. Preferably the plate is inserted into a recess in the supporting structure so that its outer surface is flush with the surrounding surface of the supporting structure. When the supporting structure is metallic a nut can be welded to the structure itself so that there is access to the thread of the nut. Of course other methods can be used to fix a nut in the supporting structure so that the thread is accessible and so that the axis of the nut is correctly placed with respect to the supporting structure, i.e. in most cases at right angles to the surfaces of the supporting structure.

The bolt, which of course must co-operate with the screw thread, must have a thread which extends far enough up the shank of the bolt so that when it is screwed into the supporting structure the sheet is held in close contact with the supporting structure. For the same reason the bolt must be short enough or there must be sufficient clearance in the supporting structure so that the bolt is not obstructed before it is screwed right into the supporting structure.

The size of the hole in the sheet through which the bolt passes must be greater than the cross-sectional area of the shank of the bolt, and in addition because the sheet must be mounted temporarily whilst the edges of the sheet are being fastened to adjacent members, the size of the of the hole must be less than the greatest cross-sectional area of the bolt, e.g. the head or flange of the bolt. Thus, when the hole is circular as it will be in most cases, the relative diameters of the hole and the shank of the bolt can vary according to the amount of free-play required when fastening the edges of the sheet. In practice a hole of diameter of between 1.5 and 2.5 times that of the shank is often suitable.

In a preferred embodiment of the invention there is a circular recess in the face of the supporting structure around the screw thread therein co-operating with a circular shoulder on the bolt between the head of the bolt and the shank of the bolt. This enables one to press out a recess in the sheet when screwing the bolt tightly into the supporting structure, and thereby preventing lateral shift of the sheet when it is finally mounted after the edges of the sheet have been fastened. The formation of a recess in the sheet by screwing the bolt right into the supporting structure should preferably not take place before the fastening operation is completed; otherwise unless the bolt is only screwed a little way into the supporting structure there will not be enough room for lateral shift of the sheet to take place when fastening its edges.

As an alternative to a shoulder a washer can, of course, be inserted between the head of the bolt and the sheet. Another alternative to a shoulder is a raised circular lip.

In another preferred embodiment of the invention the bolt also has a flange adjacent to the head of the bolt. If the bolt has a circular shoulder or circular lip, said shoulder or lip is adjacent to the flange, i.e. the flange is between the head and the shoulder or lip of the bolt. The presence of a flange enables the hole in the sheet to be larger than the head of the bolt, which may be an advantage in cases where a large amount of free-play during fastening the edges of the sheet is required. In addition, the presence of a flange means that there is a firm anchor point present in each mounted sheet to which various objects may be attached. This is a particular advantage in the case where the mounted metal sheet is one of a series of mounted trays which together form one of the walls of a membrane tank for storing liquefied gases. With a flange present one of the bolts may be used as the mounting for a pump assembly. As will be explained later, the presence of a flange is also essential for one of the methods of sealing the hole in the sheet.

Whilst fastening the edge of the sheet, the sheet must be mounted temporarily by screwing the bolt into the supporting structure, that is it must not be screwed so tight that lateral shift of the sheet is prevented. The fastening of course may be by various methods, e.g. welding (spot or seam welding or argon arc welding), brazing or soldering. When the edges of the sheet have feen fastened to one or more adjacent members, the bolt is tightened into the supporting structure and the hole must be sealed. If there are a number of adjacent mounted sheets each fastened to adjacent sheets then the fastening of the whole assembly of sheets should be completed before sealing the hole in each sheet.

One method of sealing the hole is to use a bolt with a flange, wherein, after the bolt has been tightened into the supporting structure, the entire periphery of the flange is sealed (e.g. by welding, brazing or soldering) to the sheet. Of course this sealing will be on the surface of the sheet remote from the supporting structure.

Another method of sealing the hole is to seal a closure cap to the sheet, the cap extending over the head of the bolt. A suitable form of cap is one in the shape of a boater hat. The sides of such a cap may be flattened if desired so as to form two parallel sides co-operating with the head of the bolt which itself must have at least two parallel flat sides. In this manner relative movement of sheet and bolt is prevented. The entire periphery of the closure cap is fastened to sheet (e.g. by welding, brazing or soldering) so as to effectively seal the hole in the sheet. When using a closure cap there is no need for the bolt to have a flange.

With either of the above methods of sealing, when the periphery of the closure cap or the flange is circular the center of the head of the bolt may have a small indent so that the welding equipment may be centered whilst rotating round the periphery of the cap or the flange. Of course when a closure cap is used the cap must have a small indent located therein so as to cooperate with the indent in the center of the bolt head.

Another method of sealing the hole in the sheet is for a collar surrounding the hole in the sheet to be fastened with its axis substantially at right angles to the sheet. This collar which is preferably cylindrical in shape must be large enough to accommodate the head of the bolt. The bolt is then tightened into the supporting structure, for example by using a box spanner, or preferably by providing the head of the bolt with a slot so that it can be tightened using a screwdriver. When the bolt has been tightened into the supporting structure, the hole in the sheet is sealed by fastening a plug in the collar, e.g. by welding, brazing or soldering. It is preferable to prevent relative movement between the sheet and the bolt, and this can be done by inserting a tongue into the space between the bolt and the collar so that it co-operates with a flat side of the head of the bolt, and welding the top of the tongue to the plug.

The collar is fastened to the sheet preferably before the edges of the sheet are fastened to adjacent members, because if for some reason the fastening of the collar is unsuccessful, the sheet may then be replaced before its edges are fastened to one or more adjacent members.

When using heat in sealing the hole in the sheet, to avoid the possibility of burning another hole in the sheet, the plate, or if a plate is not used, the supporting structure itself should preferably be either (a) metal e.g. copper, which has a high conductivity and so conducts the heat away so rapidly that it does not fuse with the sheet, or (b) a metal which fuses at very high temperatures, or (c) a non-fusable material of very low thermal conductivity e.g. asbestos. Instead of making the plate itself or the whole of the supporting structure of one of the above mentioned preferred materials, one need only line the surface of the plate or the supporting structure in the vicinity of the screw thread with one of these preferred materials.

Another way in which the possibility of burning the sheet itself can be avoided is to fasten, e.g. by welding, a piece of metal to the sheet in such a position that it forms a localized thickening of the sheet around the hole in the sheet. This piece of metal which is preferably a disc, and preferably of the same metal as the sheet should be of larger area than the flange, closure cap or collar so that said flange cap or collar is fastened e.g. by welding to this piece of metal and not to the sheet itself.

The invention is now described with reference to the accompanying drawings.

In FIG. 1 an exploded view of the supporting structure, sheet and flanged bolt is shown before final assembly.

In FIG. 2 is a plan view of the assembled arrangement of FIG. 1 is shown.

In FIG. 3 a cross-sectional elevation along the line III—III of FIG. 2 is shown.

In FIG. 4 a plan view of a mounted sheet with an alternative sealing arrangement is shown.

In FIG. 5 a cross-sectional elevation through the line V—V of FIG. 4 is shown.

In FIG. 6 a plan view of a mounted sheet with an alternative sealing arrangement and with the collar plug removed is shown.

In FIG. 7 a cross-sectional elevation through the line VII of FIG. 6 but with the plug in place is shown.

Referring to FIGURES 1, 2 and 3 of the drawings, a hole 1 is drilled in a plate 2. A nut 3 is secured to the copper-lined plate 2 by welding 4 (FIG. 3). The plate 2 is then secured by means of screws 6 in a recess 21 in a wooden wall 5 having an aperture 22 at least as large as hole 1.

A hole 7 of larger diameter than the diameter of the thread of the nut 3 is drilled in a metal sheet 8. A bolt 9 with flange 10 is then inserted into the hole 7 in the sheet 8. The bolt is then screwed into the nut until the sheet is almost fixed in position. The nut is not screwed tight enough for lateral shifting of the sheet 8 to be prevented.

The edges of the sheet 8 are then welded to the adjacent members, 8a, 8b and the bolt 9 further screwed into the nut 3 until the shoulder 11 on the bolt forces the sheet into the co-operating recess 12 in the plate 2. The sheet thereby itself receives a recess 23 around hole 7 therein as shown in FIG. 1. The sheet is then free to oscillate but there is not lateral shifting. Finally the edges of the flange 10 are welded to the sheet at 13 (FIG. 3) making use of the centering indent 14 in the top of the bolt 9.

Referring to FIGURES 4 and 5, similar components are identified with the same reference numerals as used in FIGURES 1, 2 and 3.

The sequence of operations is the same up to the fastening of the edges of the sheet 8 except that the bolt 15 has no flange or shoulder and that a washer 16 of slightly smaller diameter than the recess 12 in the plate 2 is inserted between the head of the bolt 15 and the sheet 8. After welding the edges of the sheet 8 the bolt 15 is screwed into the nut 3 so that a recess is formed in the sheet 8. A closure cap 17 in the shape of a boater hat with flattened sides 18 is placed over the head of the bolt so that the indent 19 in the closure cap engages the indent 14 in the head of the bolt. Using the indent 19 as a centering device the entire periphery of the closure cap 17 is welded to sheet 8 at 20, thereby sealing the hole in the sheet.

Referring to FIGURES 6 and 7, a hole 1 is drilled in the middle of the circular recess 34 in a steel plate 29. A nut 3 is then secured to the steel plate 29 by welding 4.

A stainless steel circular disc 24 is welded at 32 to the stainless steel sheet 8. In the center of this disc 24 a hole 7 of diameter larger than the diameter of the thread of the nut 3 is drilled through the center of the disc 24 and through the sheet 8. A stainless steel collar 25 is then welded at 33 to the disc 24 symmetrically about the hole 7 therein. Alternatively, if desired the collar 25 can be welded first in the center of the disc 24 before the hole 7 is drilled.

A bolt 26 having a slot 27 is then inserted through a washer 16 of slightly smaller diameter than that of the recess 34, and then through the hole 7 in the disc 24 and the sheet 8. The bolt is then screwed into the nut until the sheet is almost fixed in position, but not screwed tight enough for lateral shifting of the sheet 8 to be prevented.

The edges of the sheet 8 are then fastened to one or more adjacent members by welding, and the bolt 26 further screwed into the nut 3 until the washer 16 forces the sheet 8 and disc 24 into the recess 34 in the plate 29.

A tongue 28 is then welded at 30 to the underside of a plug 31 so that when the plug is inserted in the top of the collar 25, the tongue cooperates with a flat face of the head of the bolt 26. Finally the plug 31 is welded at 35 to the top of the collar 25 so as to form a seal.

The sheet is then free to oscillate but not free to shift laterally.

It will be apparent that the embodiments shown are only exemplary that that various modifications can be made in construction and arrangement within the scope of our invention as defined in the appended claims.

We claim:
1. A method of mounting a metal sheet on a supporting structure so that it is capable of having its edges fastened to one or more adjacent members which comprises
   (a) providing an aperture in the sheet at the point where it is to be fastened,
   (b) passing through said aperture a fastening means of smaller diameter than the aperture,
   (c) fastening said fastening means at one end to the supporting structure so as to resist axial tension on the fastening means,
   (d) providing at the other end of said fastening means an enlarged member thereon, larger than said aperture and capable of engaging the opposite side of the sheet from said supporting structure,
   (e) pressing said enlarged member lightly against said opposite side of the sheet with sufficient pressure to hold the sheet in place but not to prevent a small amount of lateral shifting of the sheet about said elongated fastening means,
   (f) fastening the sheet to an adjacent member and adjusting the sheet laterally in the process,
   (g) tightening the pressure of said enlarged member to firmly fasten the sheet in place against further lateral shifting.

2. A method as claimed in claim 1, including the step of deforming a circular area of the sheet around said aperture during step (g) by pressing the sheet at said area into a depression in the supporting structure, to thereby prevent lateral shifting of the sheet relative to the supporting structure.

3. A method as claimed in claim 2, wherein said deformed area is made circular in periphery with the center of the circle coinciding with the axis of said fastening means, whereby the sheet can rotate to a limited degree about said center.

4. A method as claimed in claim 1, including the step of sealing the said other end of the fastening means to the sheet so as to seal said aperture, after the sheet has been firmly fastened in place.

5. A supporting structure,
   (a) a metal sheet to be mounted on said supporting structure, said sheet having an aperture therein,
   (b) a supporting plate rigidly fastened to said supporting structure and providing a supporting surface for said sheet,
   (c) a recess in the surface of said supporting plate,
   (d) screw thread means fastener to said supporting plate on the opposite side from said surface and in the center of said recess,
   (e) a bolt passing through the aperture in said sheet, the size of the aperture being greater than the cross-sectional area of the shank of the bolt,
   (f) pressure means carried by said bolt and distorting a portion of said sheet around said aperture into said recess in the surface of said supporting plate when the bolt is tightened to prevent any further lateral shifting of the sheet.

6. The invention according to claim 5, said pressure means being circular in periphery, with the center of the circle at the axis of said bolt so as to permit limited rotational movement of the sheet about said axis.

7. The invention according to claim 6, said pressure means comprising a washer element between the head of the bolt and the sheet.

8. The invention according to claim 7, and sealing means comprising a closure cap covering said aperture and said bolt.

9. The invention according to claim 7, and sealing means for said aperture comprising a collar fastened with its axis at right angles to the sheet, said collar surrounding the aperture and being sufficiently large to accommodate the head of said bolt, and a plug closing the end of said collar away from the sheet.

10. The invention according to claim 7, said washer element being integral with the bolt.

11. The invention according to claim 7, and fluid-tight sealing means sealing said aperture.

12. The invention according to claim 11, said sealing means comprising a welded seam between said washer and said sheet.

References Cited by the Examiner
UNITED STATES PATENTS

| | | | |
|---|---|---|---|
| 2,986,247 | 5/1961 | Schmitt | 52—511 X |
| 3,088,361 | 5/1963 | Hallock | 52—512 X |

RICHARD W. COOKE, Jr., *Primary Examiner.*